Jan. 31, 1939. C. H. HAPGOOD 2,145,544
PROCESS AND MACHINE FOR SEPARATING HIGH VISCOSITY CREAM FROM WHOLE MILK
Filed Aug. 26, 1935 2 Sheets-Sheet 2

INVENTOR
Cyrus Howard Hapgood
BY
Busser and Harding
ATTORNEYS.

Patented Jan. 31, 1939

2,145,544

UNITED STATES PATENT OFFICE 2,145,544

PROCESS AND MACHINE FOR SEPARATING HIGH VISCOSITY CREAM FROM WHOLE MILK

Cyrus Howard Hapgood, Nutley, N. J., assignor to The De Laval Separator Company, New York, N. Y., a corporation of New Jersey.

Application August 26, 1935, Serial No. 37,895

10 Claims. (Cl. 233—47)

In the conventional centrifugal cream separator the whole milk is fed to the bowl, usually by gravity through a feed tube extending axially of the bowl, and the separated cream and skim milk are conveyed to the bowl neck, whence they discharge, at different elevations, into annular stationary pans. One or the other of the bowl outlets may be regulated to proportion the feeds and thereby predetermine the richness of the cream. It has been found that by effecting the separation in a centrifuge of the "closed" type, cream delivered therefrom having a predetermined butter fat content is apparently richer or smoother than cream having the same butter fat content that is separated in the conventional separator. Thus cream, separated in a properly constructed "closed" separator, having a 35% butter fat content may present the appearance of cream having a 40% butter fat content that is separated in a conventional separator. Further, cream of a given butter fat content separated in a "closed" machine, when used in the manufacture of certain products having a milk base, such as ice cream, imparts to those products a quality superior to that characterizing similar products manufactured from cream having the same butter fat content that is separated in the conventional machine.

The superior quality of cream of a given fat content that is separated in a "closed" separator is due to its higher viscosity and this is due to the fact that the cream may be discharged from the "closed" bowl free of air or foam and that the fat clusters are not subjected to agitation or impact tending to break them down but remain in their normal perfect state.

It was found, however, with the use of the "closed" centrifuges for the separation of cream from whole milk, that they were not adaptable to different conditions of operations due to different variable factors which tended to vary the fat content of the cream, some of which factors, when brought into operation, tended to function cumulatively to progressively increase or decrease such fat content. In "closed" separators the whole milk is pumped into the rotating bowl under a certain pressure and it was found necessary to interpose a regulable yielding resistance to the outflowing cream. The provision of a resistance that would maintain the fat globules intact presented a difficult problem. Further, if the resistance was adjusted to a given value, any variation in the pressure at the skim milk outlet, or any variation in the head of cream in the cream discharge pipe, would cause variations in the fat content of the cream.

My invention is adapted to overcome all of these difficulties and enable the operator to secure a cream of predetermined fat content regardless of the variable conditions above specified.

A preferred embodiment of the invention is shown in the accompanying drawings, in which—

Fig. 1A is an enlarged vertical sectional view of part of the throttling means shown on a smaller scale in Fig. 1.

Figure 1:
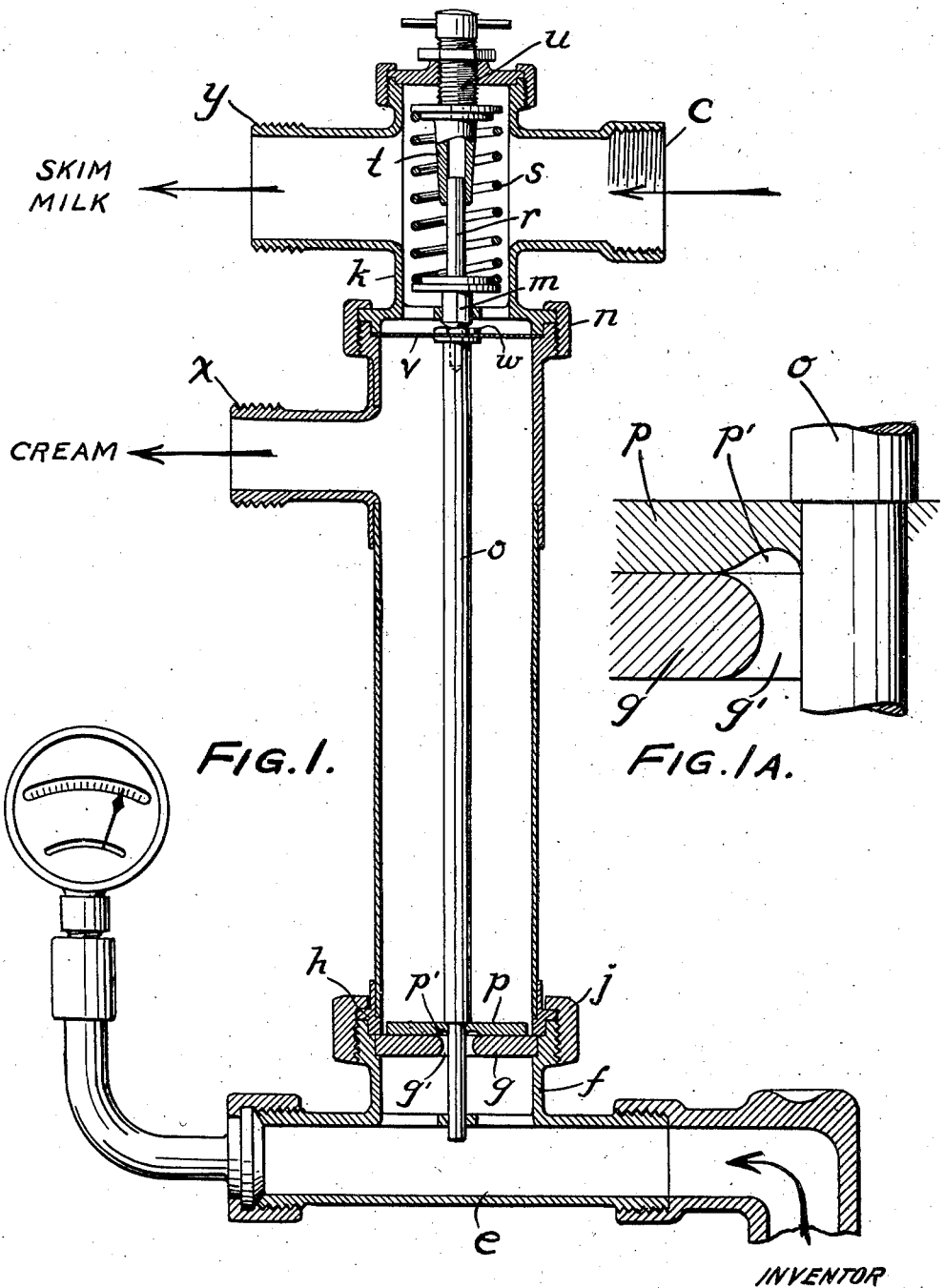
Fig. 1 is a vertical sectional view of the cream discharge passage from the separator, the cream regulating valve and the means for adjustably throttling the valve.
Figure 2:
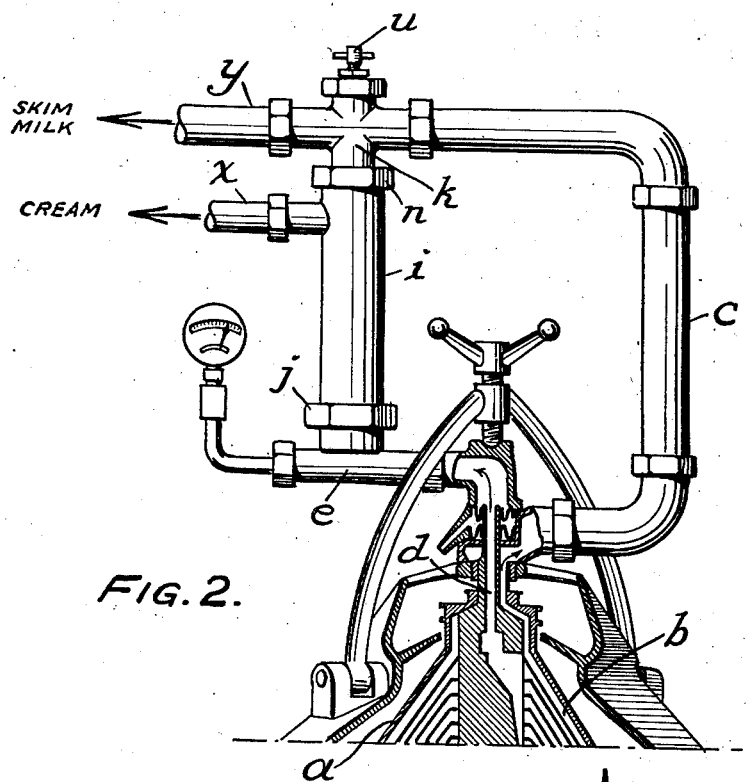
Fig. 2 is an elevation, partly in section, of the upper port of the centrifugal separator and the outflow passages for cream and skim milk.

The whole milk is fed, by a positive displacement pump (not shown) upwardly through a hollow spindle (not shown) into the separator space of the bowl $a$, the upper part of which is shown in Fig. 2. The separated skim milk flows from the periphery of the bowl through channels $b$ into the skim milk discharge pipe $c$, which may be designedly under atmospheric pressure, but wherein, in practical operation, the absolute pressure may vary within fairly wide limits due to conditions which will be understood in the art and which, therefore, need not be described. The separated cream is displaced inwardly and preferably into a quiescent zone at the center of the bowl, and is discharged through a tubular passage $d$ extending along this central zone, where no centrifugal pressure exists. The cream thence flows into a stationary horizontally extending tubular chamber $e$ (see Fig. 1). This chamber opens through its upper wall into a short T or tubular standard $f$, which has an internal shoulder supporting a partition forming a valve seat $g$. Upon the peripheral part of this partition is supported a ring $h$ having an internal shoulder which supports an upright cylindrical chamber $i$, the lower part of which is enclosed by the ring. Chamber $i$ has a lateral outlet pipe $x$ that is connected, by means not shown, with the ultimate container for the cream. By means of a nut $j$ the ring $h$ is secured in fixed relation to the tubular standard $f$ and the valve seat $g$.

Mounted upon the cylinder $i$ is a cage $k$, which is held in position by means of a nut $n$. Within cage $k$ is a spring $s$ which rests upon the head of a pin $m$ whose shank extends through and is vertically slidable in the bottom wall of the cage $k$. Pin $m$ engages a screw $w$ threaded in the upper end of a valve stem $o$ which extends downward through the center of cylinder $i$ and has a reduced lower end which extends through a central orifice in valve seat $g$ and is guided at its lower end in a bearing on chamber $e$. The annular shoulder at the upper end of the reduced lower end portion of valve stem o overlies a valve disc p and presses it against valve seat g.

Extending upward from pin m is a guiding member r which slidably engages a guiding member t, between the head of which and the head of pin m spring s is confined. By means of a manually adjustable screw u threaded in the upper wall of cage k, the pressure of the spring is adjusted, thereby adjusting the pressure of valve disc p against valve seat g.

Across the upper end of cylinder i extends a diaphragm v, the peripheral portion of which is confined between the upper end of cylinder i and the lower end of cage k. The central portion of the diaphragm is confined between the head of screw w and the upper end of valve stem o.

The central orifice g' in valve seat g has a convex wall and the lower side of valve disc p is provided with a concavity p' which overlies orifice g' and constrains cream to flow smoothly through orifice g' before its entrance between valve seat g and valve disc p.

By adjusting the screw u the pressure of valve disc p upon valve seat g may be regulated to vary the fluid pressure required to force cream between the valve members and thence into the cylinder i. The greater the pressure of the spring, the greater the resistance to flow of cream and the more concentrated the cream.

There is, however, another factor which, if not provided for, would cause variations in the resistance of flow of cream through the valve, namely, variations of the pressure head in the cream discharge. This, however, is taken care of by the diaphragm v. The pressure of the head of cream against valve disc p tending to increase resistance to cream flow is counterbalanced by the pressure against diaphragm v tending to decrease such resistance.

The above described operation is conditioned upon the maintenance of a substantially invariable difference of pressure between the cream and the skim milk outflowing from the separator. However, this difference of pressure is variable due to variations, hereinbefore mentioned, in the back pressure of the outflowing skim milk. If the back pressure of the skim milk increases above the assumed normal, the difference between this pressure and the pressure of the outflowing cream would correspondingly decrease, thus reducing the density of the cream. This condition is provided for by connecting the skim milk discharge pipe c with cage k and providing the cage with a skim milk outlet pipe y. Cage k, therefore, comprises a part of the skim milk outflow channel. The lower wall of cage k is perforated to allow the body of contained skim milk to rest on diaphragm v. Any increased pressure of the skim milk, therefore, is communicated to the diaphragm and thus to valve disc p, whereby the increased pressure of the skim milk causes an equal increase in the pressure of the outflowing cream, thus maintaining the desired pressure difference; and the density of the cream discharged through the cream valve is maintained uniform.

Figure 3:
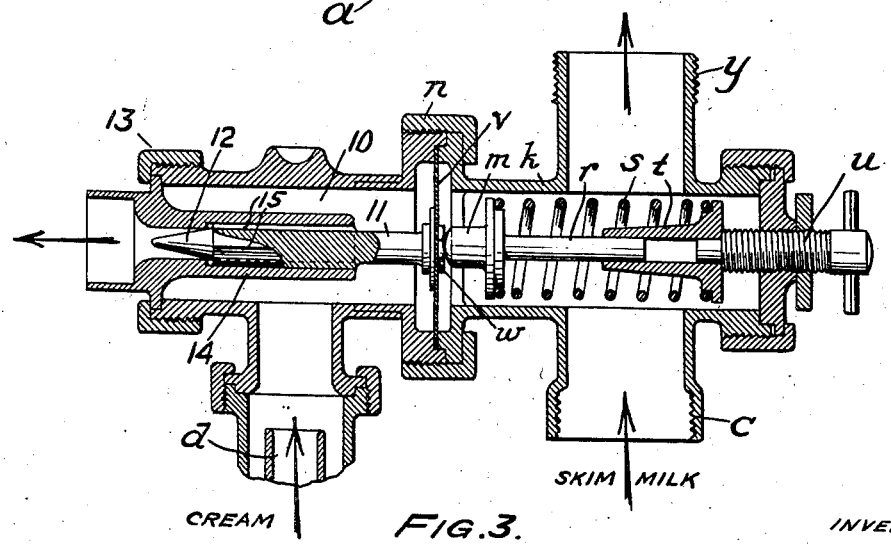
Fig. 3 is a sectional view showing the parts shown in Fig. 1, but with a modified throttling valve.

The above described construction is one of many possible embodiments of the invention. Thus, in Fig. 3 is shown another cream-regulating valve construction. The cream discharge passage from the separator communicates with a cylinder 10. Valve stem 11 corresponds to valve stem o of Fig. 1. To the end of the cylinder beyond the valve stem is secured, by means of a nut 13, a tubular member 14 within which valve stem 11 is guided. Stem 11 is provided with external longitudinally extending cream flow passages 15. The outer end of valve stem 11 is provided with a cone-shaped valve 12 which engages a valve seat formed by a contracted neck portion of tube 14.

The cream discharged from the separator flows into chamber 10 and thence through passages 15 and thence between the valve 12 and its seat.

The valve-adjusting mechanism shown is the same as that in Fig. 1 and is correspondingly lettered.

A feature of importance is the construction of the cream valve. If the valve construction is such as to impart to the cream flowing through the valve too high a velocity, as, for example, if the bottom of valve disc p is made flat, such high velocity cream impacts the cream already in chamber i, tending to break up the fat clusters and reduce the viscosity of the product. It was found possible, with a cone valve provided with a conical valve seat, to gradually reduce the pressure, as well as the velocity, beyond the entrance of the valve, and obtain satisfactory results. However, whatever type may be adopted, it must be so made that, after each period of use, it can be readily taken apart for cleaning; and, in assembling, the loose parts must be fitted together. In the case of a conical valve, there must be no variation of the valve stem guides with respect to the conical seat, else the valve cone may not be central with its seat and bind, thus causing an erratic action of the valve with corresponding changes in the back pressure of the cream and uncertain and unsatisfactory results.

These objections are not insuperable, but it is obviously advantageous to provide a simplified construction of valve which presents no difficulties of assemblage and is not liable to uncertain functioning when assembled. The valve shown in Figs. 1 and 1A is of such character. It is important, in order to secure the desired gradual reduction in pressure and velocity, that the shape of the entrance to the valve (that is, to the thin space between the opposing annular flat faces of the valve disc p and valve seat g) should be that of a nozzle whose wall is convexly curved. Such a nozzle is formed by the convexly curved wall of the central orifice g' of the valve seat cooperating with the annular valve groove p' which is concavely curved adjacent the valve stem o but is convexly curved as it approaches the entrance to the valve. Thereby the desired gradual reduction of pressure and velocity is effected, and undesired back pressure on the cream is reduced to practically zero. In assembling the valve no nicety of adjustment is required and there can be no such displacement of the parts as may produce erratic action.

The invention may be also adaptable to other uses than the separation of cream and skim milk, and it will be understood that in such of the claims as are directed to structure, the terminology used is not intended to imply an exclusion of such other uses.

What I claim and desire to protect by Letters Patent is:

1. In a centrifugal cream separator, provided with a closed passage for separated cream discharged therefrom, a valve for regulating the density of the cream interposed in said closed passage, said valve comprising a valve seat, a valve proper and a valve stem, means operating upon the valve stem to oppose an adjustable yielding resistance to the flow of cream through said valve, and a diaphragm secured to the valve stem and against which the back pressure of cream in said passage is operative to counterbalance its throttling effect upon the valve.

2. In a centrifugal cream separator, provided with closed passages for separated milk and cream discharged therefrom, a valve for regulating the density of the cream interposed in said closed passage for the cream, means adapted to oppose an adjustable yielding resistance to the flow of cream through said valve, and means operative by the pressure of skim milk in its discharge passage to oppose an additional yielding resistance to the flow of cream through said valve.

3. In a centrifugal cream separator, provided with closed passages for separated milk and cream discharged therefrom, a valve for regulating the density of the cream interposed in said closed passage for the cream, said valve comprising a valve seat, a valve proper and a valve stem, manually adjustable means operating upon said valve stem and adapted to oppose a yielding resistance to the flow of cream through said valve, and a diaphragm secured to the valve stem and subject to the pressure of the skim milk in its discharge passage to thereby oppose an additional yielding resistance to the flow of cream through said valve.

4. In a centrifugal cream separator, provided with closed passages for separated milk and cream discharged therefrom, a valve for regulating the density of the cream interposed in said closed passage for the cream, adjustable means adapted to oppose a predetermined yielding resistance to the flow of cream through said valve, and means adapted to maintain uniform the difference between the pressures of the outflowing cream and skim milk, notwithstanding variations in the pressure of the skim milk in its discharge passage, and in the back pressure of the cream beyond said valve.

5. In a centrifugal cream separator, provided with closed passages for separated milk and cream discharged therefrom, a valve for regulating the density of the cream interposed in said closed passage for the cream, adjustable means adapted to oppose a predetermined yielding resistance to the flow of cream through said valve, and means adapted to maintain uniform the difference between the pressures of the outflowing cream and skim milk notwithstanding variations in the pressure of the skim milk and in the back pressure of the cream beyond said valve, said means comprisng a diaphragm connected with said valve and subjected on one side to the pressure of skim milk and on the other side to said back pressure of cream.

6. In a centrifugal separator provided with closed passages for separated milk and cream discharged therefrom, a valve interposed in the closed passage for the cream, said valve comprising a seat having a central orifice with a convex peripheral wall, a valve disc resting upon said seat and formed on its lower face above said orifice with a concavity, whereby the cream upflowing through said orifice will flow smoothly to between the seat and disc and thence toward the peripheries of both, manually adjustable means adapted to press the disc with a yielding pressure against its seat, a valve stem engaging said valve, manually adjustable means operative upon the valve stem to press the valve disc with a yielding pressure against its seat, and a diaphragm secured to the valve stem and subject to the pressure of the skim milk in its discharge passage to thereby oppose an additional yielding resistance to the flow of cream through said valve.

7. In a centrifugal cream separator provided with a closed passage for separated cream discharged therefrom, a valve for regulating the density of the cream interposed in such closed passage, said valve comprising a valve seat, a valve proper and a valve stem, means operating upon the valve stem to oppose an adjustable yielding resistance to the flow of cream through said valve, and means secured to the valve stem and against which the back pressure of cream in said passage is operative to counterbalance its throttling effect upon the valve.

8. In a centrifugal cream separator provided with a closed passage for separated cream discharged therefrom, an adjustable yielding resistance for regulating the density of the cream interposed in such closed passage, and pressure actuated means in said passage beyond and operatively attached to said yielding resistance means, the pressure head developed beyond the resistance means by reason of increase in pressure of cream in said passage being sufficient to actuate the resistance means to increase the resistance to flow, said pressure head also acting upon the pressure actuated means to counterbalance the effect of the pressure head on the resistance means.

9. In the centrifugal separation of cream and skim milk from whole milk, the process of controlling the density of the separated cream under conditions where the back pressure in the outflowing skim milk is substantially constant over relatively long periods of time, which comprises flowing the cream through a closed conduit leading from the centrifugal separator, whereby a back pressure is developed, interposing a yielding resistance to the flow of cream through said conduit, and maintaining said resistance substantially invariable by changes in the back pressure of the outflowing cream beyond the resistance, which normally would tend to vary such resistance, by causing said back pressure to counterbalance its effect upon the resistance.

10. In the centrifugal separation of cream and skim milk from whole milk, the process of controlling the density of the separated cream under conditions where there is a variable back pressure in the outflowing skim milk, which comprises flowing the cream through a closed conduit leading from the centrifugal separator, whereby a back pressure is developed, interposing a yielding resistance to the flow of cream through said conduit, automatically varying said resistance in direct proportion to variations in the back pressure developed in the outflowing skim milk, and maintaining said resistance substantially invariable by changes in the back pressure of the outflowing cream beyond the resistance, which normally would tend to vary such resistance, by causing said back pressure to counterbalance its effect upon the resistance.

CYRUS HOWARD HAPGOOD.